(12) United States Patent
Wilson

(10) Patent No.: US 6,899,114 B2
(45) Date of Patent: May 31, 2005

(54) DEVICE FOR THE DILUTION AND APPLICATION OF LIQUIDS

(76) Inventor: Paul A. Wilson, 110 Orchard Dr., Canton, GA (US) 30115

(*) Notice: Subject to any disclaimer, the term of this patent is extended or adjusted under 35 U.S.C. 154(b) by 93 days.

(21) Appl. No.: 10/226,000

(22) Filed: Aug. 22, 2002

(65) Prior Publication Data
US 2003/0037829 A1 Feb. 27, 2003

Related U.S. Application Data

(60) Provisional application No. 60/314,058, filed on Aug. 22, 2001.

(51) Int. Cl.$^7$ .............................................. G05D 11/02
(52) U.S. Cl. ........................... 137/9; 137/209; 137/606; 137/894; 222/145.5
(58) Field of Search ................................ 137/209, 606, 137/894, 888, 9 I; 222/129.1, 129.3, 129.4, 145.5

(56) References Cited

U.S. PATENT DOCUMENTS

| | | | | |
|---|---|---|---|---|
| 2,918,928 A | * | 12/1959 | Rednour | 137/14 |
| 3,348,737 A | * | 10/1967 | Yingst et al. | 222/58 |
| 3,481,350 A | * | 12/1969 | Chamberlain | 137/3 |
| 3,703,187 A | * | 11/1972 | Booth | 137/114 |
| 3,853,245 A | * | 12/1974 | Branch et al. | 222/144.5 |
| 4,986,296 A | * | 1/1991 | Jones et al. | 137/3 |
| 5,156,814 A | * | 10/1992 | Fielden et al. | 137/209 |
| 5,628,431 A | * | 5/1997 | Roach et al. | 222/145.5 |

* cited by examiner

Primary Examiner—Stephen M. Hepperle
(74) Attorney, Agent, or Firm—James W. Kayden; Thomas, Kayden, Horstemeyer & Risley LLP

(57) ABSTRACT

A system and method for the mixing and the application of liquids to various surfaces. The system includes a primary tank having a liquid fill fitting, a gas fitting, and an outlet. A pressurized gas source is in fluid communication with the primary tank by way of the gas fitting and a mixing device is in fluid communication with both the outlet and a concentrate reservoir. The mixing device is arranged and configured to mix the liquid and the concentrate into a liquid mixture. The system is configured such that the pressurized gas source expels the liquid through the outlet and the mixing device, thereby creating the liquid mixture.

13 Claims, 4 Drawing Sheets

DEVICE FOR THE DILUTION AND APPLICATION OF LIQUIDS

CROSS-REFERENCE TO RELATED APPLICATION

This application claims priority to copending U.S. provisional application entitled, "A DEVICE FOR THE DILUTION AND APPLICATION OF LIQUIDS," having Ser. No. 60/314,058, filed Aug. 22, 2001, which is entirely incorporated herein by reference.

TECHNICAL FIELD

The present invention is generally related to liquid application systems and methods. More particularly, the invention relates to an application system and method wherein a concentrate is mixed with a liquid and the resulting liquid mixture is dispersed without the use of a pump.

BACKGROUND OF THE INVENTION

The use and application of liquid substances, such as cleaning preparations, pesticides, herbicides, fertilizers, coatings, lubricants etc., often require that the substances be diluted with a liquid, such as water, and the diluted preparation applied to a surface or introduced into a container. Typically, this is a multi-step operation that first involves the dilution process, which often requires that a concentrate and diluent be measured and placed into a container, and then that the combination be adequately mixed. The liquid mixture is then transferred by use of a transfer system to either be applied to a surface or introduced into a container. Typically, a pump functions as the motive force of the liquid mixture and is powered by an electric motor, by an internal combustion engine, or other appropriate means.

Liquid application systems are frequently encountered in the paving industry. The process of paving roads, runways, parking areas and the like with asphaltic concrete (asphalt) involves the transportation of the asphalt from the manufacturing plant to the paving site. Numerous types of vehicles are employed to transport asphalt from the manufacturing plant to the paving site. These vehicles include tandem dump trucks, tri-axle dump trucks, dump trailers, live-bottom trailers, hopper trailers, center drop trailers, double trailers, and the like. The asphalt transported by these vehicles is received "hot" so that it is in a workable condition at the paving site. To prevent the asphalt from sticking or adhering to the bed of the transportation vehicle, a lubricating type material, commonly known as an asphalt release agent, is applied to the truck bed prior to loading the asphalt.

The most common form of release agents are liquids which are sprayed, splashed, or otherwise applied to the vehicle truck beds. One common method of applying the release agent to the truck bed is by the use of a pump-up sprayer. In such applications, a measure of release agent is placed into the tank of the pumping unit, diluted as required (typically with water), agitated, and then pressurized to a sufficient air pressure to spray the bed of the truck. The spraying is conducted by the vehicle operator or personnel at the asphalt plant by controlling a wand or a nozzle to direct the flow of the spray unit. This method is somewhat ineffective in that the sprayers generally do not spray uniformly, and encounter decreasing air pressure while they are being used.

Other conventional spray units typically employ a pump to urge the diluent through the system, thereby both creating a liquid mixture including the diluent and the release agent and supplying the necessary pressure to spray the diluted release agent through an appropriate nozzle. Such units tend to suffer from a lack of control over the release agent concentration, and a lack of uniformity of application due to variability of the output pressure of the pump.

Accordingly, there is a need for a system and method of applying various liquid solutions wherein the concentration and application of the liquid solution can be controlled without the use of a pump.

SUMMARY OF THE INVENTION

Embodiments of the present invention provide a system and method for the mixing and the application of liquids to various surfaces. Briefly described, one embodiment of the system includes a primary tank having a liquid fill fitting, a gas fitting, and an outlet. A pressurized gas source is in fluid communication with the primary tank by way of the gas fitting and a mixing device is in fluid communication with both the outlet and a concentrate reservoir. The mixing device is arranged and configured to mix the liquid and the concentrate into a liquid mixture. The system is configured such that the pressurized gas source expels the liquid through the outlet and the mixing device, thereby creating the liquid mixture.

The present invention can also be viewed as providing methods for of mixing and dispensing a liquid mixture. The method includes the steps of filling a primary tank to a desired level with liquid, pressurizing the primary tank to a desired pressure with a pressurized gas source, and passing the liquid through a mixing device, thereby mixing the liquid with a concentrate to create a liquid mixture.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 3 is a schematic diagram of an embodiment of a liquid application system of the present invention.

Figure 1:
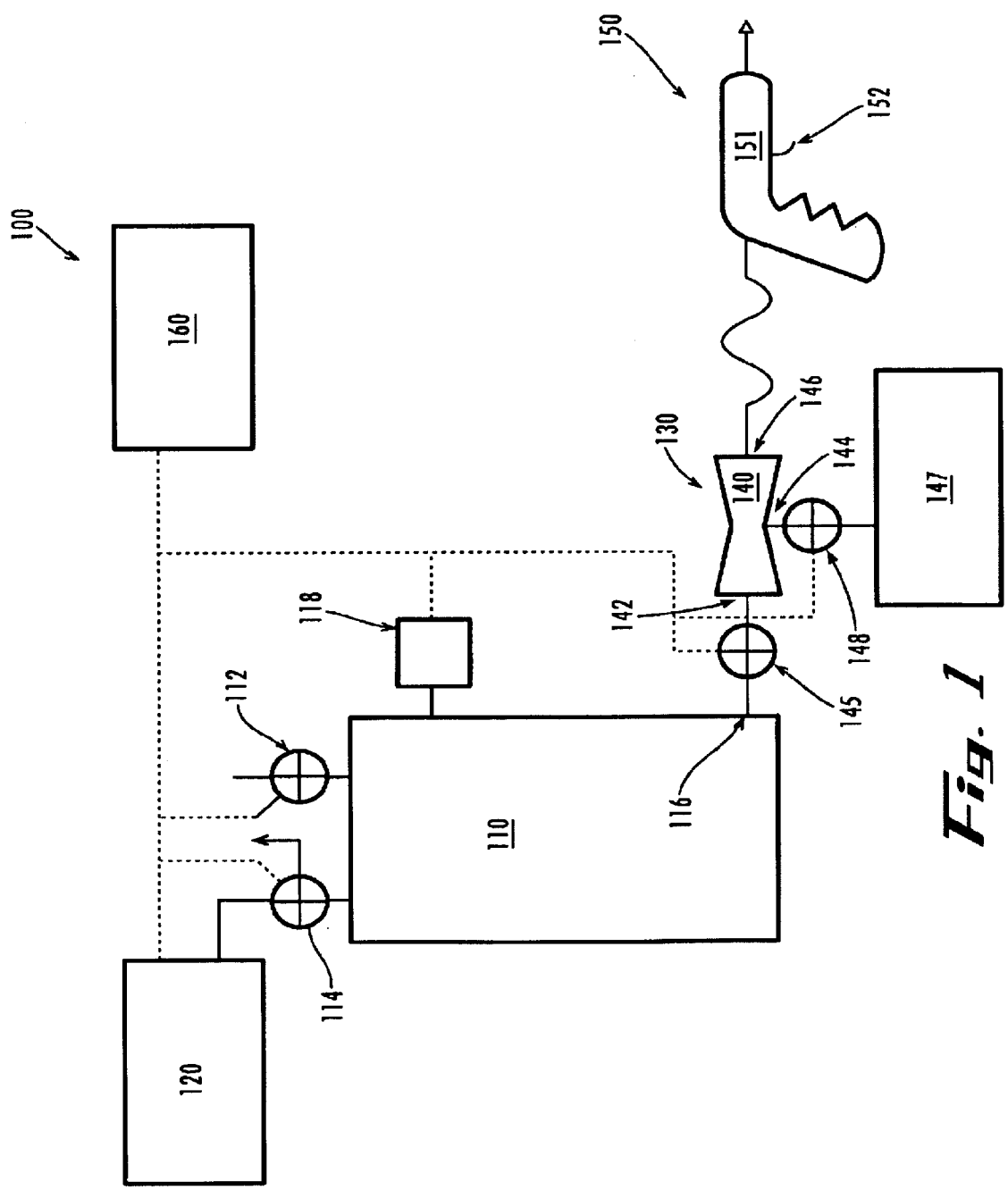
FIG. 1 is a schematic diagram of an embodiment of a liquid application system of the present invention.

Reference will now be made in detail to the description of the liquid application system illustrated in the drawings. While the liquid application system will be described in connection with these drawings, there is no intent to limit it to the embodiment or embodiments disclosed therein. On the contrary, the intent is to cover all alternatives, modifications and equivalents included within the spirit and scope of the liquid application system as defined by the appended claims.

DETAILED DESCRIPTION OF THE PREFERRED EMBODIMENT

Referring now in more detail to the drawings, FIG. 1 illustrates an embodiment of a liquid application system 100. Preferably, the system includes a primary tank 110, a pressurized gas source 120, a mixing device 130, a concentrate reservoir 147, and a flow activation device 150. As shown, the primary tank includes a liquid fill fitting 112, a gas fitting 114, an outlet 116, and a liquid fill control device 118. The pressurized gas source 120 is in fluid communication with the primary tank 110 by way of the gas fitting 114. Preferably, the gas fitting 114 is a three way valve that can be used to line-up the pressurized gas source 120 to the primary tank 110 during pressurization, isolate the primary tank 110 from the pressurized gas source 120, and vent the primary tank 110 to atmosphere during liquid fill operations or simply to de-pressurize the primary tank 110. The liquid fill fitting 112 is preferably a valve that is used to either line-up the primary tank 110 to a liquid source (not shown) during fill operations or isolate the primary tank 110 from the liquid source during pressurization of the tank with the pressurized gas source 120. The liquid fill control device 118 is used to determine the amount of liquid in the primary tank 110 and thereby indicate when the flow of liquid into the tank should be secured. However, the system 100 need not include the liquid fill control device 118 as the amount of liquid to be added to the primary tank can be pre-determined before fill operations.

Preferably, the mixing device 130 is a venturi having an inlet side 142, an outlet side 146, a suction 144, and an activation valve 145. The inlet side 142 is adjacent the outlet 116 of the primary tank 110 and the suction 144 is in fluid communication with the concentrate reservoir 147. The activation valve 145 is used to prevent the flow of liquid through the venturi 140 until desired. The activation valve 145 need not be a part of the venturi 140, but instead can be on the upstream or downstream side of the venturi 140. Preferably, a ratio selector 148 is disposed in the suction 144 between the venturi 140 and the concentrate reservoir 147. Although not necessary to the present invention, the ratio selector 148 permits the ratio of concentrate to liquid to be adjusted, or allows the concentrate reservoir 147 to be isolated from the venturi 140. A flow activation device 150, a trigger activated wand 151 is shown, is frequently disposed on the outlet side of the venturi 140 to allow manual application of the liquid mixture to a desired surface. Alternatively, the venturi 140 may deliver the liquid mixture to an automatic spray device (not shown) rather than a manual one.

Although the system 100 can be operated manually, embodiments are envisioned wherein an electronic controller 160 is used to automatically operate the system. For example, as shown, electronic controller 160 can be used to operate some, or all, of the liquid fill fitting 112, the gas fitting 114, the activation valve 145, and the ratio selector 148. The electronic controller 160 can be used to activate/de-activate the pressurized gas source 120 as well as receive inputs from the liquid fill control device 118. The electronic controller can be either a programmable logic controller (PLC) or a device such as a timer/relay.

Figure 2:
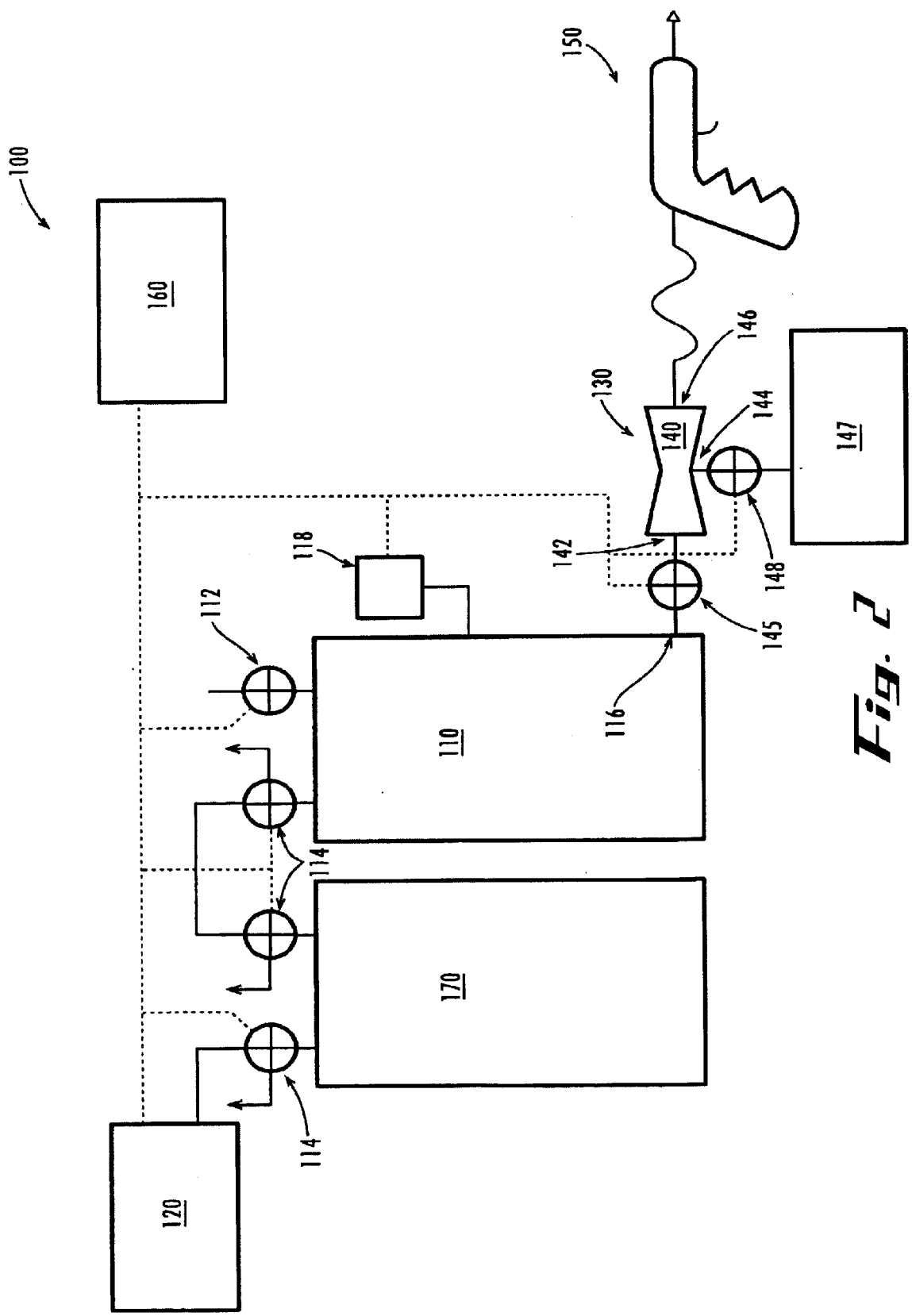
FIG. 2 is a schematic diagram of an embodiment of a liquid application system of the present invention.
Figure 1:
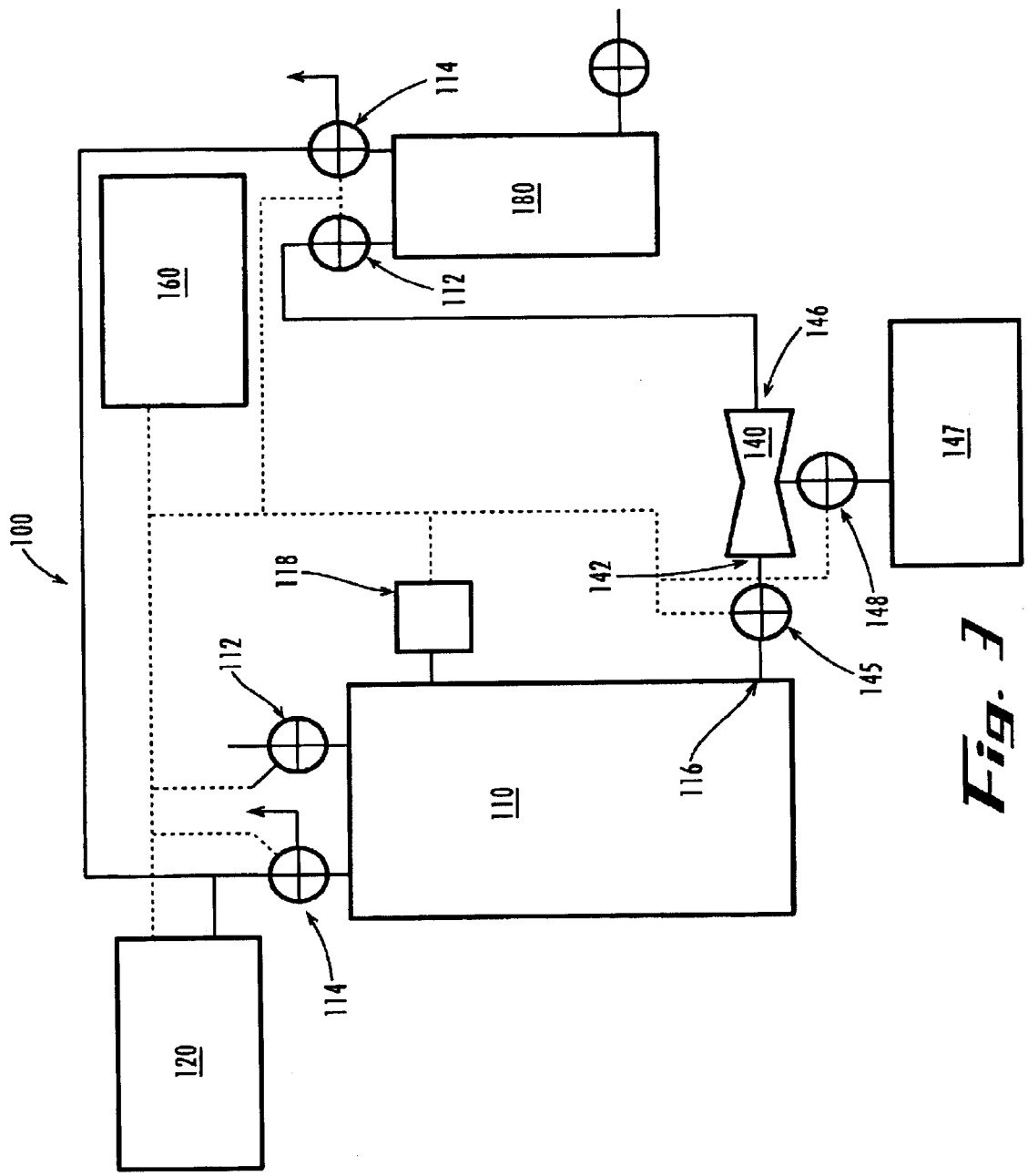

As shown in FIG. 2, other embodiments include a reservoir gas tank 170 disposed between the pressurized gas source 120 and the primary tank 110. The reservoir gas tank 170 includes an inlet and an outlet, each typically fitted with a gas fitting 114 similar to those found on the primary tank 110. The reservoir gas tank 170 adds flexibility to the system 100 in that the primary tank 110 can be pressurized although the pressurized gas source 120 has been secured. The reservoir gas tank 170 can be lined up to multiple primary tanks 110.

Figure 4:
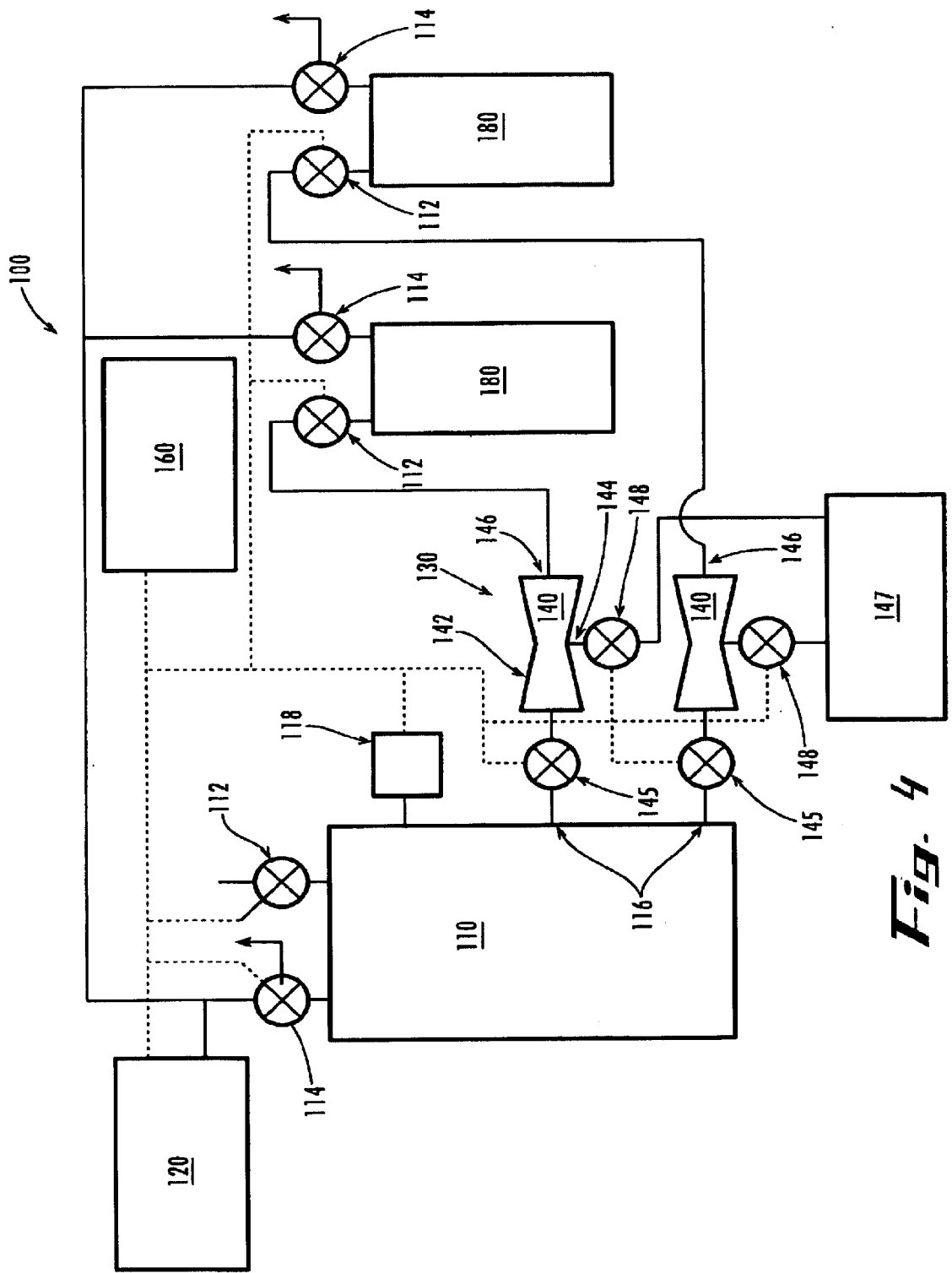
FIG. 4 is a schematic diagram of an embodiment of a liquid application system of the present invention.

As shown in FIG. 3, other embodiments include a receiver tank 180 disposed on the downstream side of the venturi 140. Typically, the receiver tank includes a liquid fill fitting 112, a gas fitting 114, and an outlet 116, similar to those found on the primary tank 110. The receiver tank 180 functions as a storage area for the liquid mixture after it has been prepared, but prior to application. The liquid mixture is introduced into the receiver tank 180 through the liquid fill fitting 112 while the gas fitting 114 is used to vent the receiver tank 180. Once the liquid mixture is in the receiver tank, the liquid fill fitting 112 is used to isolate the receiver tank 180 from the primary tank 110 and the gas fitting 114 is used to pressurize the receiver tank 180 with the pressurized gas source 120. With the receiver tank pressurized, the liquid mixture is then dispensed either through a flow activation device 150 (FIGS. 1 and 2), or an automatic spray device (not shown). Each primary tank 110 can be lined up with one or more receiver tanks 180. As well, the primary tank can have one venturi 140 lined up to multiple receiver tanks 180, or rather, have an individual venturi 140 dedicated to each receiver tank 180 as shown in FIG. 4. This permits a single primary tank 110 to be used to prepare and store multiple liquid mixtures of varying concentrations, depending upon the settings of each venturi 140 and contents of each concentrate reservoir 147, either independent of each other or simultaneously. Because each receiver tank is pressurized independently, the liquid mixtures contained in multiple receiver tanks may also be dispensed either simultaneously or independently. Embodiments are envisioned that include both reservoir gas tanks 170 (FIG. 2) and receiver tanks 180.

One embodiment does not utilize a pressurized gas source 120, but rather, utilizes a positive displacement pump (not shown), such as a diaphragm, gear or piston type, to introduce liquid into the primary tank 110. As liquid is pumped into the primary tank 110 with all fittings closed with the exception of the liquid fill fitting 112, the primary tank 110 becomes pressurized as the gas present in the tank is compressed. Because no pressurized gas source 120 is required for operation, the gas fitting 114 can be omitted from this embodiment.

OPERATION

Operation of the embodiment as shown in FIG. 1 will now be addressed. While filling the primary tank 110 with the desired liquid (preferably water), the primary tank 110 is vented through the gas fitting 114 to facilitate the operation. The liquid fill control device 118 detects and controls the amount of liquid introduced into the primary tank 110, preferably, the amount of liquid introduced into the tank is approximately 30–95% of the volume of the primary tank 110. Alter be introduced into the primary tank 110, thereby negating the use of the liquid fill control device 118. Liquid may be introduced into the primary tank 110 by any suitable means, such as gravity, pumping, or pressure from a community water system. Once the primary tank 110 has been filled to the desired level, the liquid fill fitting 112 is placed in the closed position to isolate the primary tank 110 from the source of the liquid. The primary tank 110 is next pressurized by placing the gas fitting 114 into a position that secures venting of the primary tank 110 and lines the tank up with the pressurized gas source 120. Preferably, the pressurized gas source 120, such as a compressor, remains lined up to the primary tank 110 during operation of the system 100, however, the gas fitting 114 may be used to isolate the primary tank 110 after the tank has been pressurized.

After the primary tank 110 has been pressurized, the liquid contained therein is passed through a mixing device 130 that mixes the liquid with a concentrate stored in the concentrate reservoir 147. As shown, the venturi 140 is the preferred mixing device. The venturi 140 may be either a fixed concentration venturi or a variable concentration venturi. To initiate flow through the venturi 140, the activation valve 145, such as an air actuated ball valve or a solenoid valve, is opened, thereby allowing liquid to flow into the inlet side 142 of the venturi 140. As the liquid flows from the inlet side 142 to the outlet side 146 of the venturi 140, concentrate from the concentrate reservoir 147 is drawn through the suction 144 and entrained in the flow of liquid. The ratio selector 148 is used to adjust the amount of concentrate entrained for a given flow rate, and therefore to adjust the concentration of the resulting liquid mixture. As shown, the flow of liquid through the venturi 140 is controlled by a trigger activated wand for manually applying the liquid mixture to a desired surface. Alternately, the liquid mixture can be directed to an automatic spray device (not shown) or a receiver tank 180 (FIG. 3).

As previously noted, an electronic controller 160 can be used to operate the system 100. When such a device is used, the operation of the pressurized gas source 120, gas fittings 114, liquid fill fittings 112, liquid fill control device 118, and activation valve 145 are all synchronized so that the system functions in an automatic fashion. Although all embodiments of the present system 100 can be operated in an automatic fashion, the system of FIG. 1 is discussed herein. Upon an operator activating the system 100, the controller places the gas fitting 114 in position to vent the primary tank 110 to atmosphere and the liquid fill fitting 112 in position to fill the primary tank 110. Sensing and control lines 162 of the controller are represented by dashed lines. Once the liquid fill control device 118 detects the desired volume of liquid in the primary tank 110, the controller 160 isolates the primary tank 110 from the liquid supply source by repositioning the liquid fill fitting 112 and subsequently re-positions the gas fitting 114 such that the pressurized gas source 120 pressurizes the primary tank 110 to the desired pressure, preferably from approximately 50 pounds per square inch (psi) to 2000 psi.

Once the primary tank 110 has been pressurized, the controller 160 operates the activation valve 145, thereby allowing liquid to flow into the venturi 140. Flow is initiated through the venturi 140 by activating the flow activation device 150. As shown, this is accomplished by manually pulling a trigger 152 on a wand applicator 151. In other embodiments, flow through the venturi will initiate when the controller 160 opens the activation valve 145, such as when the venturi is lined up to a receiver tank 170 (FIG. 3) or an automatic nozzle system (not shown). Once a predetermined volume of liquid has passed through the venturi 140, the controller 160 will close the activation valve 145, vent the primary tank 110 to atmosphere, and line up the liquid fill fitting 112 to fill the primary tank in preparation for the next application operation.

It should be emphasized that the above-described embodiments of the present liquid application system 100, particularly, any "preferred" embodiments, are merely possible examples of implementations, merely set forth for a clear understanding of the principles of the liquid application system 100. Many variations and modifications may be made to the above-described embodiment(s) of the liquid application system 100 without departing substantially from the spirit and principles of the liquid application system 100. All such modifications and variations are intended to be included herein within the scope of this disclosure and the present liquid application system 100 and protected by the following claims.

What is claimed is:

1. A system for mixing a liquid and a concentrate, and for applying a resulting liquid mixture, comprising:

a primary tank having a liquid fill fitting, a gas fitting, and an outlet;

a pressurized gas source in fluid communication with said primary tank by way of said gas fitting, said gas fitting being operable between a pressurize position and a vent position, said pressurize position placing said pressurized gas source in fluid communication with said primary tank and said vent position venting said primary tank to atmosphere;

a concentrate reservoir for holding the concentrate;

a venturi in fluid communication with said outlet and said concentrate reservoir, said venturi having an inlet side, a suction, and an outlet side, said inlet side being adjacent said outlet and said suction being in fluid communication with said concentrate reservoir, said venturi being arranged and configured to mix the liquid and the concentrate into the liquid mixture;

an activation valve having an open and a closed position, wherein said closed position preventing the liquid from flowing through said venturi and said open position allowing the liquid to flow through said venturi; and wherein said system is configured such that said pressurized gas source expels the liquid through said outlet and said mixing device, thereby creating the liquid mixture.

2. The system of claim 1, further comprising an electronic controller device arranged and configured to operate said gas fitting, said liquid fill fitting, and said activation valve.

3. A system for mixing a liquid and a concentrate, and for applying a resulting liquid mixture, comprising:

a primary tank having a liquid fill fitting, a gas fitting, and an outlet;

a pressurized gas source in fluid communication with said primary tank by way of said gas fitting;

a concentrate reservoir for holding the concentrate;

a mixing device in fluid communication with said outlet and said concentrate reservoir, said mixing device being arranged and configured to mix the liquid and the concentrate into the liquid mixture;

a water level control device arranged and configured to regulate a volume of the liquid allowed to flow into said primary tank; and wherein said system is configured such that said pressurized gas source expels the liquid through said outlet and said mixing device, thereby creating the liquid mixture.

4. A system for mixing a liquid and a concentrate, and for applying a resulting liquid mixture, comprising:

a primary tank having a liquid fill fitting, a gas fitting, and an outlet;

a pressurized gas source in fluid communication with said primary tank by way of said gas fitting;

a concentrate reservoir for holding the concentrate;

a mixing device in fluid communication with said outlet and said concentrate reservoir, said mixing device being arranged and configured to mix the liquid and the concentrate into the liquid mixture;

a reservoir air tank disposed between said pressurized gas source and said primary tank, said reservoir tank being configured to be isolated from both said pressurized gas source and said primary tank;

a receiver tank in fluid communication with said mixing device such that said receiver tank receives the liquid mixture, said receiver tank being in fluid communication with said pressurized gas source such that said receiver tank can be pressurized and the liquid mixture can be expelled from said receiver tank; and wherein said system is configured such that said pressurized gas source expels the liquid through said outlet and said mixing device, thereby creating the liquid mixture.

5. A system for mixing a liquid and a concentrate, and for applying a resulting liquid mixture, comprising:

a primary tank having a liquid fill fitting, a gas fitting, and an outlet;

a pressurized gas source in fluid communication with said primary tank by way of said gas fitting;

a concentrate reservoir for holding the concentrate;

a mixing device in fluid communication with said outlet and said concentrate reservoir, said mixing device being arranged and configured to mix the liquid and the concentrate into the liquid mixture;

a reservoir air tank disposed between said pressurized gas source and said primary tank, said reservoir tank being configured to be isolated from both said pressurized gas source and said primary tank; and wherein said system is configured such that said pressurized gas source expels the liquid through said outlet and said mixing device, thereby creating the liquid mixture.

6. In a liquid application system including a primary tank, a pressurized gas source, a concentrate, and a mixing device, a method of mixing and dispensing a liquid mixture, comprising the steps of:

venting the primary tank to atmosphere;

filling the primary tank to a desired level with the liquid;

pressurizing the primary tank to a desired pressure with the pressurized gas source; and passing the liquid through the mixing device, thereby mixing the liquid with the concentrate to create the liquid mixture.

7. The method of claim 6, wherein the passing step further includes passing the liquid through a venturi that is in fluid communication with a concentrate reservoir.

8. In a liquid application system including a primary tank, a pressurized gas source, a concentrate, and a mixing device, a method of mixing and dispensing a liquid mixture, comprising the steps of:

filling the primary tank to a desired level with the liquid;

pressurizing the primary tank to a desired pressure with the pressurized gas source;

passing the liquid through the mixing device, thereby mixing the liquid with the concentrate to create the liquid mixture;

storing the liquid mixture in a receiver tank from which the liquid mixture is dispensed; and pressurizing the receiver tank with the pressurized gas source in order to dispense the liquid mixture.

9. A tank, a pressurized gas source, a concentrate, and a mixing device, a method of mixing and dispensing a liquid mixture, comprising the steps of:

filling the primary tank to a desired level with the liquid;

pressurizing a reservoir air tank that is in fluid communication with the primary tank and then pressurizing the primary tank with the reservoir air tank; and passing the liquid through the mixing device, thereby mixing the liquid with the concentrate to create the liquid mixture.

10. A system for mixing a liquid and a concentrate, and for applying a resulting liquid mixture, comprising:

a primary tank having a liquid fill fitting, a gas fitting, and an outlet;

a pressurized gas source in fluid communication with said primary tank by way of said gas fitting;

a concentrate reservoir for holding the concentrate;

a plurality of mixing devices in fluid communication with said outlet and said concentrate reservoir, said mixing devices being arranged and configured to mix the liquid and the concentrate into the liquid mixture;

a plurality of receiver tanks, each receiver tank in fluid communication with one of said mixing devices such that said receiver tanks receive the liquid mixtures, each said receiver tank being in fluid communication with said pressurized gas source such that said receiver tanks can be pressurized and the liquid mixtures can be expelled from said receiver tanks; and wherein said system is configured such that said pressurized gas source expels the liquid through said outlet and said plurality of mixing devices, thereby creating the liquid mixtures.

11. The system of claim 10, wherein the liquid mixtures received by each of the receiving tanks is of a varying concentration.

12. In a liquid application system including a primary tank, a pressurized gas source, a concentrate, and a plurality of mixing devices, a method of mixing and dispensing a liquid mixture, comprising the steps of:

filling the primary tank to a desired level with the liquid;

pressurizing the primary tank to a desired pressure with the pressurized gas source; and passing the liquid through the plurality of mixing devices, thereby mixing the liquid with the concentrate to create the liquid mixture.

13. The method of claim 12, wherein the liquid mixture from each of the plurality of mixing devices is stored in a separate one of a plurality of receiver tanks.

\* \* \* \* \*